United States Patent

Randolph

[15] 3,649,829

[45] Mar. 14, 1972

[54] LAMINAR FLOW CELL

[72] Inventor: Henry W. Randolph, Belvedere, S.C.

[73] Assignee: The United States of America as represented by the United States Atomic Energy Commission

[22] Filed: Oct. 6, 1970

[21] Appl. No.: 78,427

[52] U.S. Cl. .............. 250/43.5 FC, 73/23.1, 250/43.5 MR, 250/83.6 FT
[51] Int. Cl. ..................................................... G01n 23/12
[58] Field of Search ............. 250/43.5 FC, 43.5 MR, 43.5 R, 250/83.6 FT, 218; 73/23.1; 356/246

[56] References Cited

UNITED STATES PATENTS

| | | |
|---|---|---|
| 3,238,367 | 3/1966 | Sternberg et al. ..................... 250/43.5 |
| 3,444,722 | 5/1969 | Roof ..................................... 73/23.1 |

*Primary Examiner*—Archie R. Borchelt
*Attorney*—Roland A. Anderson

[57] ABSTRACT

A sample fluid, containing, for example, radioactive material, is made to flow as an integral core within a column of inert fluid through the sensitive zone of a monitor such as a radiation detector. The inert fluid acts as a sheath to prevent contamination of stationary surfaces within the sensitive zone. Sample fluid is injected into the flow of inert fluid with a minimum of turbulence and mixing.

10 Claims, 3 Drawing Figures

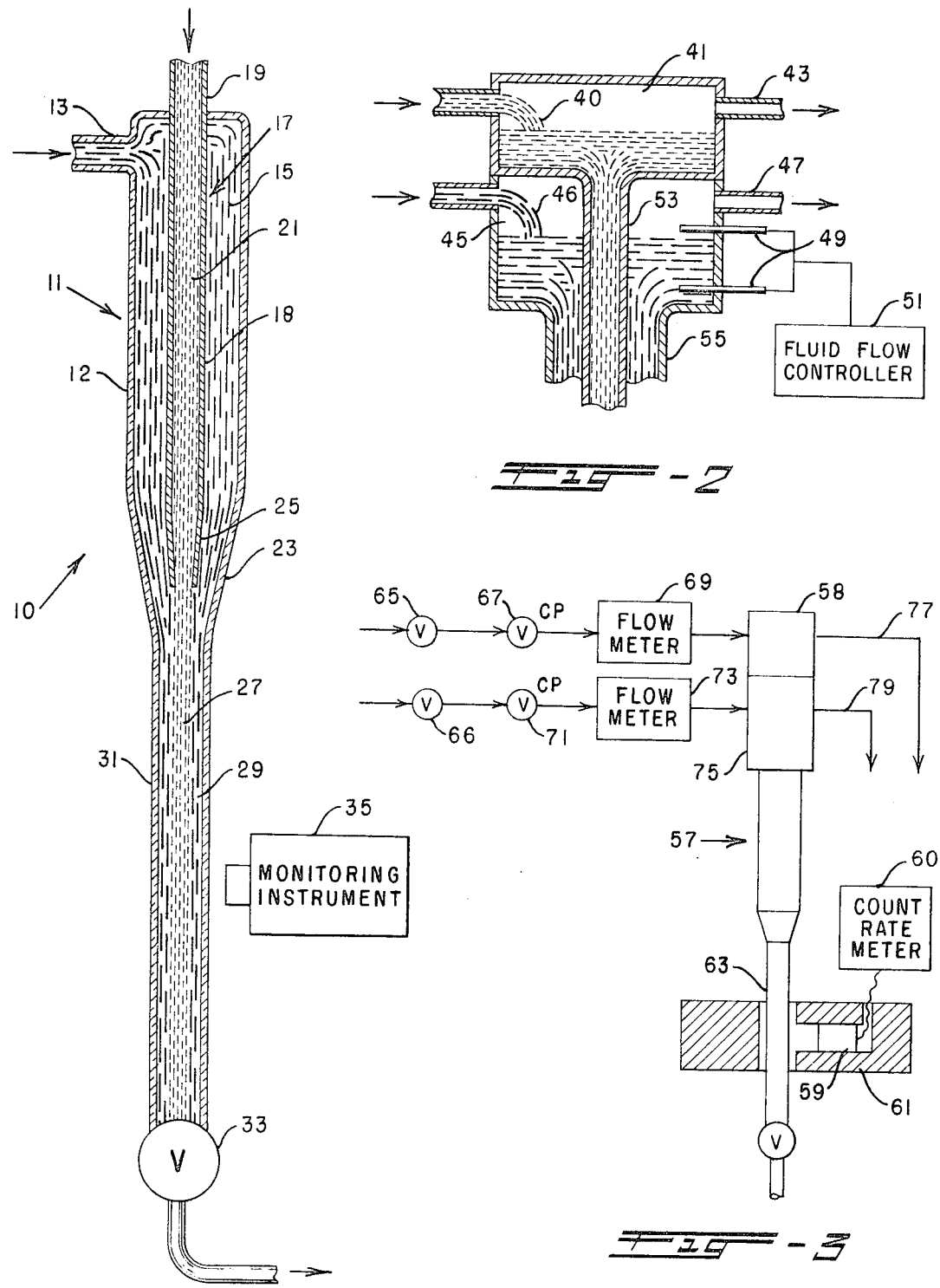

LAMINAR FLOW CELL

BACKGROUND OF THE INVENTION

This invention was made in the course of or under a contract with the United States Atomic Energy Commission.

1. Field of the Invention

The present invention relates to the monitoring of a flowing sample fluid where it is desirable to prevent contamination of surfaces within a sensitive zone by the sample. For instance, radioactive fluid samples that are passed through or near a radiation detector can deposit radioactive material on surfaces within the sensitive zone of the detector. This radioactive contamination if not removed can result in erroneous subsequent readings. Also in the colorimetric examination of fluid dyes passing through a portion of transparent conduit, contamination of the conduit surfaces can prevent determination of the actual color of later dye samples.

The invention is particularly applicable to the monitoring of liquid samples, but may also be used for gas sample monitoring. One application related to the principles of the present invention in respect to gases is disclosed in the assignee's copending U.S. Pat. application Ser. No. 78,538, filed Oct. 6, 1970.

2. Description of Prior Art

Previous techniques for continuous examination of sample fluids have failed to completely overcome the effects of residual contamination on surfaces within the examination zone. Purge flows with inert or cleaning fluids are time consuming and wasteful and may not remove all contamination. Continuous purging with inert carrier fluids merely dilutes the sample and will not prevent some sample material from reaching and contaminating surfaces in the vicinity of the monitor.

SUMMARY OF INVENTION

Therefore it is an object of the present invention to provide an accurate method for monitoring a flowing sample fluid without interference from contamination by earlier flow.

It is also an object to provide a laminar flow cell for maintaining a sample fluid flow apart from stationary surfaces within the sensitive zone of a monitoring instrument.

It is a further object to prevent the radioactive contamination of conduit and other surfaces in the vicinity of a radiation detector monitoring a radioactive fluid.

In accordance with the present invention a flow of sample fluid is entrained as a parallel flowing integral core within a flowing column of buffer or inert fluid. Both fluids are maintained at laminar flow rates to prevent mixing while passing through the sensitive zone of a monitoring instrument such as a radiation detector or colorimeter.

A laminar flow cell is provided including an outer conduit for the inert fluid flow. An inner conduit is disposed within the outer conduit for injecting the sample fluid flow into a flowing column of inert fluid. The outer conduit includes an initial straight section followed by a converging section, and an elongated section of reduced diameter. The inner conduit includes an initial straight section and terminates with a converging section within the converging section of the outer conduit without entering the elongated section. A monitoring instrument is disposed with its sensitive zone encompassing the elongated section of the outer conduit. The sample fluid is accelerated within the inner conduit converging section with inwardly directed velocity and is thereby maintained as an integral core surrounded by inert fluid through the elongated section. Since the sample fluid does not contact any stationary surfaces within the sensitive zone of the monitoring instrument, the possibility of contaminating sample material adhering and remaining within the sensitive zone is minimized. Consequently, the monitoring instrument can accurately detect the characteristics, such as radioactivity or color of the sample fluid.

DESCRIPTION OF THE DRAWINGS

The present invention is illustrated in he accompanying drawings wherein:

FIG. 1 is a view in cross section of a preferred embodiment of a laminar flow cell.

FIG. 2 is a fragmentary view partially in cross section of another embodiment of a laminar flow cell.

FIG. 3 is a schematic diagram of a continuous gamma activity monitor employing a laminar flow cell of the present invention.

DETAILED DESCRIPTION OF THE PREFERRED EMBODIMENT

Referring now to FIG. 1, a laminar flow cell 10 is illustrated having an outer conduit 11 with an inlet 13 for introducing a buffer or inert fluid 15. An inner conduit 17 with sample inlet 19 for admitting a sample fluid 21 is shown coaxially disposed within conduit 11. Both outer conduit 11 and inner conduit 17 have sufficiently long straight sections 12 and 18 respectively following their inlets 13 and 19 to allow initial inlet turbulence to subside. A nozzle or converging section 23 is provided in the outer conduit 11 following straight section 12 for molding the flow of inert fluid 15 into a fluid sheath 29. Inner conduit 17 is terminated with a nozzle or converging section 25, concentrically disposed within converging section 23. Converging section 25 inwardly directs the sample fluid flow into an integral core 27 within fluid sheath 29. An elongated outer conduit section 31 of reduced diameter is coupled to the smaller or reduced diameter of converging section 23 to contain the flowing inert fluid sheath 29 with the enclosed integral sample core 27 flowing parallel to sheath 29. A flow control valve 33 is installed at the end of elongated conduit section 31 opposite converging section 23 for regulating the flow at laminar rates.

A suitable monitoring instrument 35 is disposed adjacent or proximate to elongated section 31 such that the sensitive zone of instrument 35 does not encompass any sections of the laminar flow cell other than the elongated section 31. Monitoring instrument 35 can be any of various radiation detectors or colorimetric instruments well known in the art depending on the specific application of the laminar flow cell.

Although the flow of fluids within laminar flow cell 10 are shown entering at the top and leaving from the bottom, the orientation of the cell can be reversed with inlets 13 and 19 disposed at the bottom and elongated section 31 towards the top to provide an upward flow through the cell. An upward flow would more readily remove entrained gases from elongated section 31.

The materials used in constructing the flow cell 10 depend on the particular fluids and monitoring techniques employed. For instance a transparent material such as glass is required especially in elongated section 31 for colorimetric determinations. In like manner, it may be desirable to add dye to a radioactive sample fluid to ascertain whether or not the sample remains as an integral core, and in this respect transparent materials could be of value in constructing a laminar flow cell for radiation monitoring. Equally important in the construction of a cell used in radiation monitoring, is the selection of materials that will not be activated by decay particles from the sample to produce interfering radiation. Such materials can be selected using known principles of nuclear activation reactions.

A number of substances can be selected for use as inert fluid 15. The density and viscosity should be matched as close as possible to the sample fluid. If both the sample and inert fluids are liquid rather than gases, density and viscosity variations with temperature will not be as great and better performance can be expected from he laminar flow cell. In colorimetric determinations the inert fluids forming sheath 29 should be transparent. For radiation measurements a nonradioactive or radio-inert fluid is preferred. Distilled water might often be chosen for use in either of these type monitoring systems.

To retain the sample fluid as an integral core 27 within the inert fluid sheath 29 and away from the walls of elongated section 31, turbulence within the fluids should be avoided. The Reynolds number of both fluids (flow diameter X fluid velocity X fluid density/fluid viscosity) should be between 100 to 1,000 within elongated section 31. The optimum range of Reynolds numbers is between 400 and 500 since higher numbers may result in some turbulence and lower velocities or numbers may permit density and temperature disturbances to reach the conduit walls.

Another possible source of turbulence is from the injection of the sample fluid into the inert fluid flow. If the density and viscosity of the two fluids are nearly the same the turbulence at the point of injection is not so great. However, if the densities and viscosities are not matched within about 1 percent, the streamlined nozzles or converging sections 23 and 25 have increased relevance in preventing instability. Converging sections 23 and 25 that have a reduction to about one-half their original or maximum inside diameters along a length of one to three maximum inside diameters have performed satisfactorily with fluids having densities and viscosities matched within about 1 to 10 percent. Where the fluids are matched to within about 1 percent in respect to density and viscosity, straight concentric tubes without converging sections can be used to inject an integral core of one fluid into another.

The overall length of laminar flow cell 10 should be at least about 20 times the maximum inside diameter of the outer conduit 11. Elongated section 31 should be about one-third to one-half the length of the laminar flow cell. As an example, satisfactory laminar flow cells can have maximum inside diameters of about 0.4 to 5 centimeters and lengths of about 10 to 200 centimeters.

Cells of the type shown and described in conjunction with FIG. 1 have been found to be stable over a 10 to 1 range of flow rates when the sample and inert fluids are closely matched in density and viscosity. Through use of different size cells, integral cores of sample fluid with diameters of about 0.2 centimeters to 1.5 centimeters have been obtained over lengths of 5 to 100 centimeters.

Another embodiment of the present invention is shown in FIG. 2. Sample liquid 40 is shown entering a vent chamber 41 having an overflow outlet 43. Entrained gases which might otherwise interfere with monitoring of a liquid sample can be removed through outlet 43. Similarly vent chamber 45 receives inert liquid 46 and permits venting and overflow through outlet 47. Conductivity probes 49 sense the level of liquid in chamber 45 and can be used to control the flow of the sample or the inert liquid with fluid flow controller 51 and suitable valves (not shown in FIG. 2) within the liquid feedlines.

Chambers 41 and 45 are connected to inner conduit 53 and outer conduit 55 respectively to pass the contained liquids through converging sections similar to those at 23 and 25 shown in FIG. 1. By maintaining a constant small head of liquid in chambers 41 and 45, laminar flow is obtained through an elongated section similar to that shown at 31 in FIG. 1 for monitoring the sample fluid.

Referring to FIG. 3, one manner of employing a laminar flow cell 57 with a continuous gamma activity monitor is shown. A scintillation probe 59 used as a radiation monitor is disposed within a housing of shielding material 61 adjacent the elongated section 63 of laminar flow cell 57. A count rate meter 60 receives and counts the output from probe 59. A solenoid valve 65 admits a sample of radioactive fluid to a pressure regulating valve 67 and a flow meter 69 for controlling and monitoring the sample flow. The sample flow is introduced into the laminar flow cell 57 through a chamber 58. The inert fluid flow is similarly admitted through valve 66 and controlled with pressure regulator 71 and flow meter 73 before entering the laminar flow cell 57 by way of chamber 75. Overflow lines 77 and 79 vent chambers 58 and 75 respectively to remove entrained air and provide overflow if either fluid is introduced at too great a rate. Conductivity probes as shown in FIG. 2 at 49 can be used to control solonoid valve 65 to shut off sample flow if the inert fluid flow rate moves above or below a safe operating range.

The continuous gamma activity monitor of FIG. 3 can be operated with a sample flow of about 70 cubic centimeters per minute of radioactive nitric acid solution used in a plutonium separation process. A water flow of about 900 cubic centimeters per minute serves as a buffer or radio-inert fluid to isolate the contaminated nitric acid within the laminar flow cell. Pressure regulator 67 and 71 maintain constant flow of nitric acid and water to within about 5 percent under varying supply pressures.

Gamma monitors of this type have been used without contamination of the laminar flow cell. Nitric acid sample solutions of zirconium -95, niobium -95 and ruthenium -103 with activities of up to $10^6$ disintergrations per minute per milliliter have been passed through the laminar flow cell with recovery to normal background count level after about 10 minutes.

This invention provides a method of monitoring a sample fluid with such as a radiation detector while preventing sample material from contaminating surfaces within range of the detector. Also a laminar flow cell is provided for maintaining a sample fluid flow apart from conduit walls by enclosing the sample within a sheath of inert fluid flow. The invention is applicable, not only to radiation monitoring but also to colorimetric or other monitoring where residual sample within range of the monitoring instrument could give misleading results.

What is claimed is:

1. Method of monitoring a flowing sample fluid with a monitoring instrument having a zone of sensitivity comprising:
   a. entraining said sample fluid as an integral core, flowing parallel, within a flowing column of inert fluid,
   b. maintaining said fluids in laminar flow, and
   c. passing said fluids in parallel laminar flow through said zone of sensitivity.

2. The method of claim 1 wherein said fluids in laminar flow are maintained at Reynolds numbers of about 100 to 1,000.

3. The method of claim 1 wherein said fluids are liquids.

4. The method of claim 1 wherein said integral core of sample fluid is injected through a converging conduit section into coaxial alignment with said flowing column of inert fluid.

5. A laminar flow cell for use in combination with a monitoring instrument that includes a zone of sensitivity comprising:
   a. an outer conduit having
      1. a converging section including an initial and a reduced diameter disposed outside said zone of sensitivity,
      2. an elongated section coupled to said converging section at said reduced diameter and disposed within said zone of sensitivity,
   b. an inner conduit disposed within said outer conduit and outside said zone of sensivity, said inner conduit terminating with a converging section within said converging section of said outer conduit; and
   c. means for introducing in laminar flow an inert fluid into said outer conduit and a sample fluid into said inner conduit, and means for maintaining said sample fluid as an integral core at a laminar flow rate within said inert fluid through said elongated outer conduit section.

6. The laminar flow cell of claim 5 wherein a flow control valve is connected at the end of said elongated conduit section opposite said converging conduit section for controlling the flow rates of said sample and inert fluids.

7. The laminar flow cell of claim 5 wherein said outer conduit length is more than about 20 times its maximum inside diameter.

8. The laminar flow cell of claim 5 wherein said converging sections in said outer and said inner conduits have a length of about one to three times the maximum inside diameter of the respective conduit and a reduction to about one-half the maximum inside diameter of the respective conduit.

9. The laminar flow cell of claim 5 wherein said introducing means includes a pressure regulator and flow meter for maintaining laminar flow rates in both said sample and inert fluid flow.

10. The laminar flow cell of claim 5 wherein said monitoring instrument comprises a radiation detector for monitoring a radioactive sample fluid within a sheath of radio-inert fluid.

* * * * *